US008060711B2

(12) United States Patent
Hiraiwa et al.

(10) Patent No.: US 8,060,711 B2
(45) Date of Patent: Nov. 15, 2011

(54) STORAGE SYSTEM

(75) Inventors: Yuri Hiraiwa, Sagamihara (JP); Hiroshi Nasu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 667 days.

(21) Appl. No.: 12/153,970

(22) Filed: May 28, 2008

(65) Prior Publication Data

US 2009/0248954 A1 Oct. 1, 2009

(30) Foreign Application Priority Data

Mar. 25, 2008 (JP) ................................ 2008-077354

(51) Int. Cl.
*G06F 12/00* (2006.01)

(52) U.S. Cl. ....................................... 711/161; 711/163

(58) Field of Classification Search .................. 711/161, 711/163
See application file for complete search history.

(56) References Cited

U.S. PATENT DOCUMENTS 7,155,466 B2 12/2006 Rodriguez et al.
2003/0225793 A1 * 12/2003 Chakraborty ................ 707/200
2006/0010177 A1 * 1/2006 Kodama ........................ 707/204
2006/0075001 A1 * 4/2006 Canning et al. ............... 707/203
2006/0085487 A1 * 4/2006 Hara et al. .................... 707/200
2008/0172563 A1 * 7/2008 Stokes ......................... 713/193

* cited by examiner

*Primary Examiner* — Hashem Farrokh
(74) *Attorney, Agent, or Firm* — Stites & Harbison PLLC; Juan Carlos A. Marquez, Esq.

(57) ABSTRACT

Provided is a storage system capable of holding data by associating main data for long-term retention with sub data for maintaining its readability. The storage system: stores first data in a first location within a storage area upon reception of a storage request for the first data with a first file identifier being specified; holds information for associating the first file identifier, the first location, a retention period of the data, and first version information with one another; stores second data in a second location within the storage area upon reception of a storage request for the second data with the first file identifier and second version information being specified; holds information for associating the first file identifier, the second location, and the second version information with one another; and inhibits the first data and the second data from being changed before elapse of the retention period of the data.

14 Claims, 14 Drawing Sheets

4000 4100-1

METADATA 4101

FILE ID=FileA

4110

| Ver. MANAGEMENT : OFF | Ver. MANAGEMENT : OFF | Ver. MANAGEMENT : OFF | Ver. MANAGEMENT : ON | Ver. MANAGEMENT : ON | Ver. MANAGEMENT : ON | Ver. MANAGEMENT : ON | Ver. MANAGEMENT : ON |
|---|---|---|---|---|---|---|---|
| RETENTION PERIOD | FILE PROTECTION | AUTHOR | Ver. ID | CREATION DATE | HASH VALUE | SOFTWARE INFORMATION | POINTER TO DATA OBJECT |
| 2100/ 12/31 | INEFFECTIVE | User 1 | 1 (MAIN) | | #### | NULL | Address 1 |
| | | | 2 (SUB) | | #### | Software 2.0 | Address 2 |
| | | | 3 (SUB) | | #### | Software 3.0 | Address 3 |

4102 4103 4104 4105 4106 4107 4108 4109

FILE ID=FileB 4100-2

Ver. ID "1" ADDED

| | 4102 | 4103 | 4104 | 4105 | 4106~4108 | 4113 | 4114 | 4109 |
|---|---|---|---|---|---|---|---|---|
| 4111 | FIXED | FIXED | FIXED | CHANGEABLE | CHANGEABLE | CHANGEABLE | CHANGEABLE | CHANGEABLE |
| 4112 | | | | ALL | Role1 | | Role1,2 | Role1 |
| 4110 | Ver. MANAGEMENT: OFF | Ver. MANAGEMENT: OFF | Ver. MANAGEMENT: OFF | Ver. MANAGEMENT: ON | Ver. MANAGEMENT: ON | Ver. MANAGEMENT: OFF | Ver. MANAGEMENT: ON | Ver. MANAGEMENT: ON |
| | RETENTION PERIOD | FILE PROTECTION | AUTHOR | Ver. ID | | ACL | COMMENT | POINTER TO DATA OBJECT |
| | 2100/ 12/31 | INEFFECTIVE | User 1 | 1 (MAIN) | | ALL | AA | Address 1 |

FIG. 11A

Ver. ID "2" ADDED

| | | | | | | | | |
|---|---|---|---|---|---|---|---|---|
| 4111 | FIXED | FIXED | FIXED | CHANGEABLE | CHANGEABLE | CHANGEABLE | CHANGEABLE | CHANGEABLE |
| 4112 | | | | ALL | Role1 | | Role1,2 | Role1 |
| 4110 | Ver. MANAGEMENT: OFF | Ver. MANAGEMENT: OFF | Ver. MANAGEMENT: OFF | Ver. MANAGEMENT: ON | Ver. MANAGEMENT: ON | Ver. MANAGEMENT: OFF | Ver. MANAGEMENT: ON | Ver. MANAGEMENT: ON |
| | RETENTION PERIOD | FILE PROTECTION | AUTHOR | Ver. ID | | ACL | COMMENT | POINTER TO DATA OBJECT |
| | 2100/ 12/31 | INEFFECTIVE | User 1 | 1 (MAIN) | | ALL | AA | Address 1 |
| | | | | 2 (SUB) | | | AA | Address 2 |
| | 4102 | 4103 | 4104 | 4105 | 4106~4108 | 4113 | 4114 | 4109 |

FIG. 11B

Ver. ID "3" ADDED

| | 4102 | 4103 | 4104 | 4105 | 4106~4108 | 4113 | 4114 | 4109 |
|---|---|---|---|---|---|---|---|---|
| 4111 | FIXED | FIXED | FIXED | CHANGEABLE | CHANGEABLE | CHANGEABLE | CHANGEABLE | CHANGEABLE |
| 4112 | | | | ALL | Role1 | | Role1,2 | Role1 |
| 4110 | Ver. MANAGEMENT: OFF | Ver. MANAGEMENT: OFF | Ver. MANAGEMENT: OFF | Ver. MANAGEMENT: ON | Ver. MANAGEMENT: ON | Ver. MANAGEMENT: OFF | Ver. MANAGEMENT: ON | Ver. MANAGEMENT: ON |
| | RETENTION PERIOD | FILE PROTECTION | AUTHOR | Ver. ID | | ACL | COMMENT | POINTER TO DATA OBJECT |
| | 2100/12/31 | INEFFECTIVE | User 1 | 1 (MAIN) | | ALL | AA | Address 1 |
| | | | | 2 (SUB) | | | AA | Address 2 |
| | | | | 3 (SUB) | | | AA,BB | |

FIG. 11C

STORAGE SYSTEM

CLAIM OF PRIORITY

The present application claims priority from Japanese application JP2008-77354 filed on Mar. 25, 2008, the content of which is hereby incorporated by reference into this application.

BACKGROUND

This invention relates to a method of managing data for a storage system for archiving contents, in particular, unstructured fixed contents.

There are known many different data archive methods, any one of which has some shortcoming. Up until the recent past, the most commonly-used data archive method has used a tape archive. However, the tape archive is often hard to access, which prevents archived data from being retrieved quickly with ease. On this account, it becomes more common to select as an archive medium a disk array that allows access to the archived data quickly with ease.

A fixed content aware storage (FCAS) is generally defined by Storage Networking Industry Association (SNIA) as a storage of unchanging data (fixed contents) and metadata associated therewith based on a variety of naming schemas, and includes a content addressable storage (CAS) and global content-independent identifiers (see, for example, www.snia.org). In the storage industry, the CAS may be referred to also as "content addressed storage", "content aware storage", or "content archive storage".

In the CAS, data is handled as an object composed of a file and metadata, rather than processed as a standard file. The data (file) is appended with the metadata (attributes of the file) and assigned a unique object identifier known as an "object ID". For the data archive, the object is stored in any given location on a hard disk. U.S. Pat. No. 7,155,466 discloses a storage system and a data management method as an example of CAS implementation.

SUMMARY

As described above, the CAS having an object to retain contents for a long period of time with safety (in other words, without tampering or data loss) can retain the object data for a long period of time. However, since stored data is retained in the exact form, there is a probability that the contents that are retrieved after the long-period retention cannot be recognized as readable data. This may be because an application for referencing the contents becomes a generation or more ahead, the application itself disappears due to changes in social conditions, or the like.

The above-mentioned problem can be solved by changing original data into data compatible with a new application to create new contents and archiving the new contents. However, the original data cannot be tampered, so the created contents are archived as another object different from the original data. Therefore, the newly created contents cannot be retained in association with the original data.

According to a representative invention disclosed in this application, there is provided a storage system coupled to one or more computers, comprising: a storage device for providing a storage area for data; and a controller for controlling data to be written to and read from the storage area, wherein the controller is configured to: store first data in a first location within the storage area upon reception of a storage request for the first data with a first file identifier being specified; hold information for associating the first file identifier, the first location, a retention period of the data, and predetermined first version information with one another; store second data in a second location within the storage area upon reception of a storage request for the second data with the first file identifier and second version information being specified; hold information for associating the first file identifier, the second location, and the second version information with one another; inhibit the first data from being changed before elapse of the retention period of the data; and inhibit the second data stored in the second location associated with the first file identifier from being changed before the elapse of the retention period of the data.

According to one embodiment of this invention, when contents for a long period of time is retained without tampering, it is possible to retain main data to be retained without tampering and sub data for auxiliary use such as for referencing the contents in association with each other so as to conform to the same protection policy.

BRIEF DESCRIPTION OF THE DRAWINGS

FIGS. 11A to 11C are explanatory diagrams of an example of states of the metadata in the case where the data is added, according to the third embodiment of this invention.

DETAILED DESCRIPTION OF THE PREFERRED EMBODIMENTS

A first embodiment of this invention will be described in detail by referring to FIGS. 1 to 7.

Methods of controlling an input to and an output from a computer, and using a storage area within a storage subsystem are the same as those described in the "BACKGROUND OF THE INVENTION" section.

Figure 1:
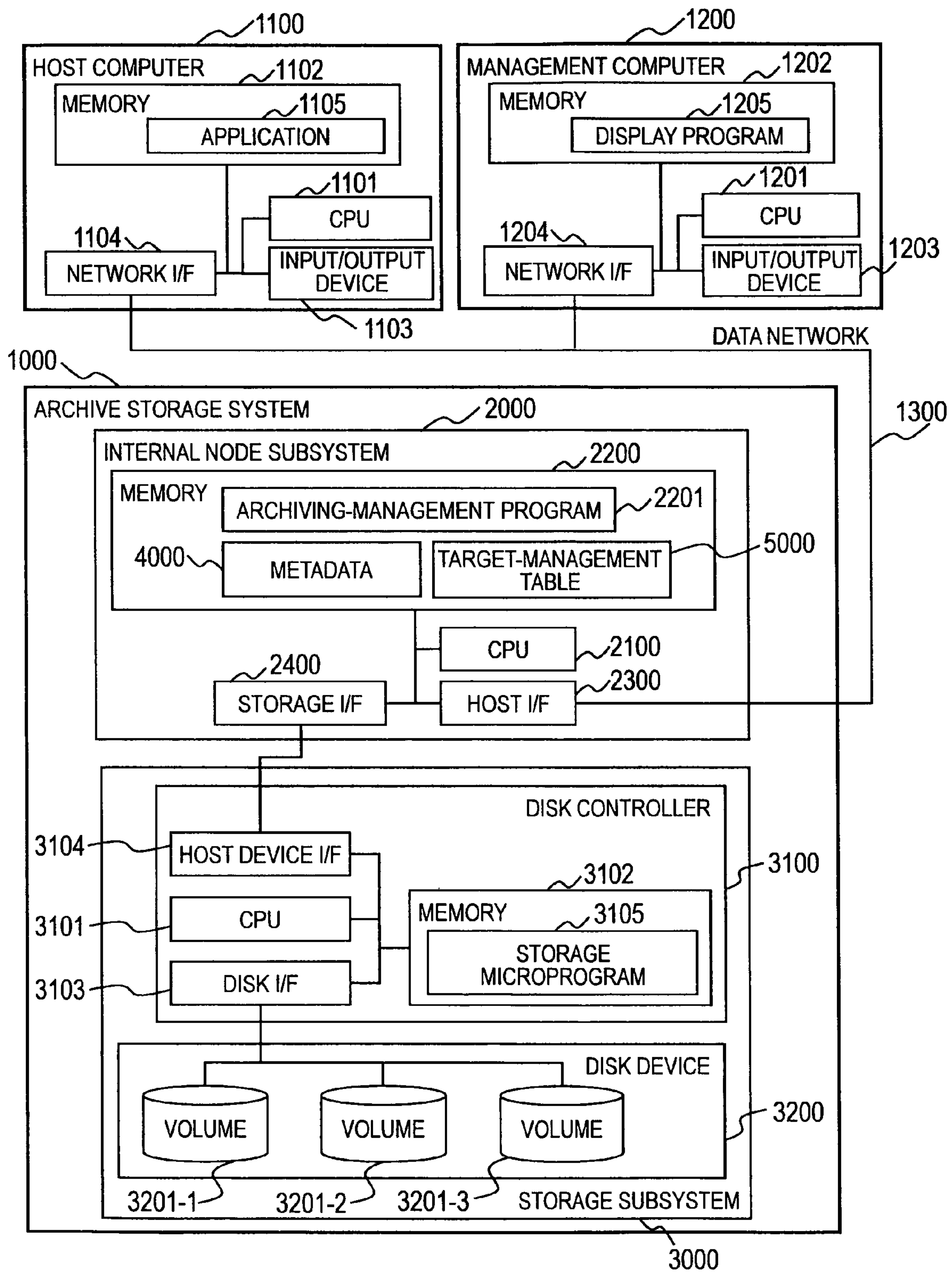
FIG. 1 is a block diagram showing a configuration of a computer system according to a first embodiment of this invention.

FIG. 1 is a block diagram showing a configuration of a computer system according to the first embodiment of this invention.

The computer system of this embodiment includes a host computer 1100, an archive storage system 1000 to be accessed by the host computer 1100, a management computer 1200, and a data network 1300.

The data network 1300 represents a network for data communication which couples the host computer 1100, the archive storage system 1000, and the management computer 1200 with one another. The data network 1300 of this embodiment is an IP network. It should be noted that the data network 1300 may be a network (for example, storage area network (SAN)) other than the IP network as long as the network is the network for data communication.

The management computer 1200 and the host computer 1100 may be implemented by a single computer.

For convenience in description, each of the host computer 1100, the archive storage system 1000, and the management computer 1200 is described as one component in this embodiment, but the number of those components may be more than one.

The archive storage system 1000 represents a so-called content archive storage (CAS), including an internal node subsystem 2000 and a storage subsystem 3000.

The internal node subsystem 2000 includes a CPU 2100, a memory 2200, a host interface (I/F) 2300, and a storage I/F 2400, which are coupled to one another.

The storage I/F 2400 represents a network interface for coupling the internal node subsystem 2000 to the storage subsystem 3000. The storage I/F 2400 transmits/receives data and a control command to/from the storage subsystem 3000.

The host I/F 2300 represents a network interface for coupling the internal node subsystem 2000 to the data network 1300. The host I/F 2300 transmits/receives data and a control command to/from the host computer 1100 and the management computer 1200 via the data network 1300.

The CPU 2100 represents a processor for executing a program stored in the memory 2200. In the following description, a processing executed by the program stored in the memory 2200 is actually executed by the CPU 2100.

The memory 2200 stores an archiving-management program 2201, metadata 4000, and a target-management table 5000. The archiving-management program 2201 performs archive management as described in U.S. Pat. No. 7,155,466. The archive management as described in U.S. Pat. No. 7,155,466 includes responding to write to and read from the host computer 1100, placing the written content data, and assigning the metadata.

The metadata 4000 and the target-management table 5000 will be described later in detail by referring to FIGS. 2 and 3.

The storage subsystem 3000 includes a disk controller 3100 and a disk device 3200. The disk controller 3100 controls a processing of the storage subsystem 3000. The disk device 3200 stores data for which a write request is made from the internal node subsystem 2000.

The disk device 3200 includes a plurality of volumes 3201-1, 3201-2, and 3201-3. Those plurality of volumes 3201-1, 3201-2, and 3201-3 will be referred to generically as a volume 3201.

The volume 3201 may be any one of a hard disk drive (HDD) serving as a physical storage area and a logical device serving as a logical storage area. In this invention, any types of volume may be used. For convenience in description, three volumes 3201 are shown in FIG. 1, but the number of volumes 3201 may be any number more than one. It should be noted that in this embodiment, the HDD is used as a storage device for providing the physical storage area, but may be replaced by a storage device of another type (for example, a semiconductor memory such as a flash memory).

The disk controller 3100 includes a CPU 3101, a memory 3102, a disk I/F 3103, and a host device I/F 3104.

Stored in the memory 3102 is a storage microprogram 3105.

The storage microprogram 3105 is executed by the CPU 3101. In response to a request from the internal node subsystem 2000, the storage microprogram 3105 writes and reads data to and from the disk device 3200.

In this embodiment, the storage microprogram 3105 is stored in the memory 3102 of the disk controller 3100, to which this invention is not limited. For example, the storage microprogram 3105 may be stored in a flash memory coupled to the disk controller 3100, or may be stored in the volume 3201 included in the disk device 3200.

The host device I/F 3104 represents a network interface for coupling the storage subsystem 3000 to the internal node subsystem 2000. The host device I/F 3104 transmits/receives data and a control command to/from the internal node subsystem 2000.

The disk I/F 3103 represents an interface for coupling the disk controller 3100 to the disk device 3200.

The host computer 1100 includes a CPU 1101, a memory 1102, an input/output device 1103, and a network I/F 1104, which are coupled to one another.

The network I/F 1104 represents a network interface for coupling the host computer 1100 to the data network 1300. The network I/F 1104 transmits/receives data and a control command to/from the archive storage system 1000 via the data network 1300.

An application 1105 is stored in the memory 1102, and is executed by the CPU 1101.

The application 1105 reads/writes data serving as contents from/to the archive storage system 1000. For example, the application 1105 is document management software, a file system, or the like.

For convenience in description, one application 1105 is shown in FIG. 1, but the number of applications 1105 may be more than one.

The input/output device 1103 may be, for example, a keyboard, a mouse, and a display.

It should be noted that the host computer 1100 may be a physically single computer or a virtual computer generated by logically dividing the physically single computer. For the latter, resources such as the CPU 1101, the memory 1102, the input/output device 1103, and the network I/F 1104 are virtual resources generated by logically dividing physical resources.

The management computer 1200 includes a CPU 1201, a memory 1202, an input/output device 1203, and a network I/F 1204, which are coupled to one another.

The network I/F 1204 represents a network interface for coupling the management computer 1200 to the data network 1300. The network I/F 1204 transmits/receives data and a control command to/from the archive storage system 1000 via the data network 1300.

Stored in the memory 1202 is a display program 1205. The display program 1205 is executed by the CPU 1201. An input from a user and display with respect to the user are performed through a graphical user interface (GUI) by the display program 1205. A file conversion program (not shown), which will be described later, may also be stored in the memory 1202.

The input/output device 1203 may be, for example, a keyboard, a mouse, and a display.

Figure 2:
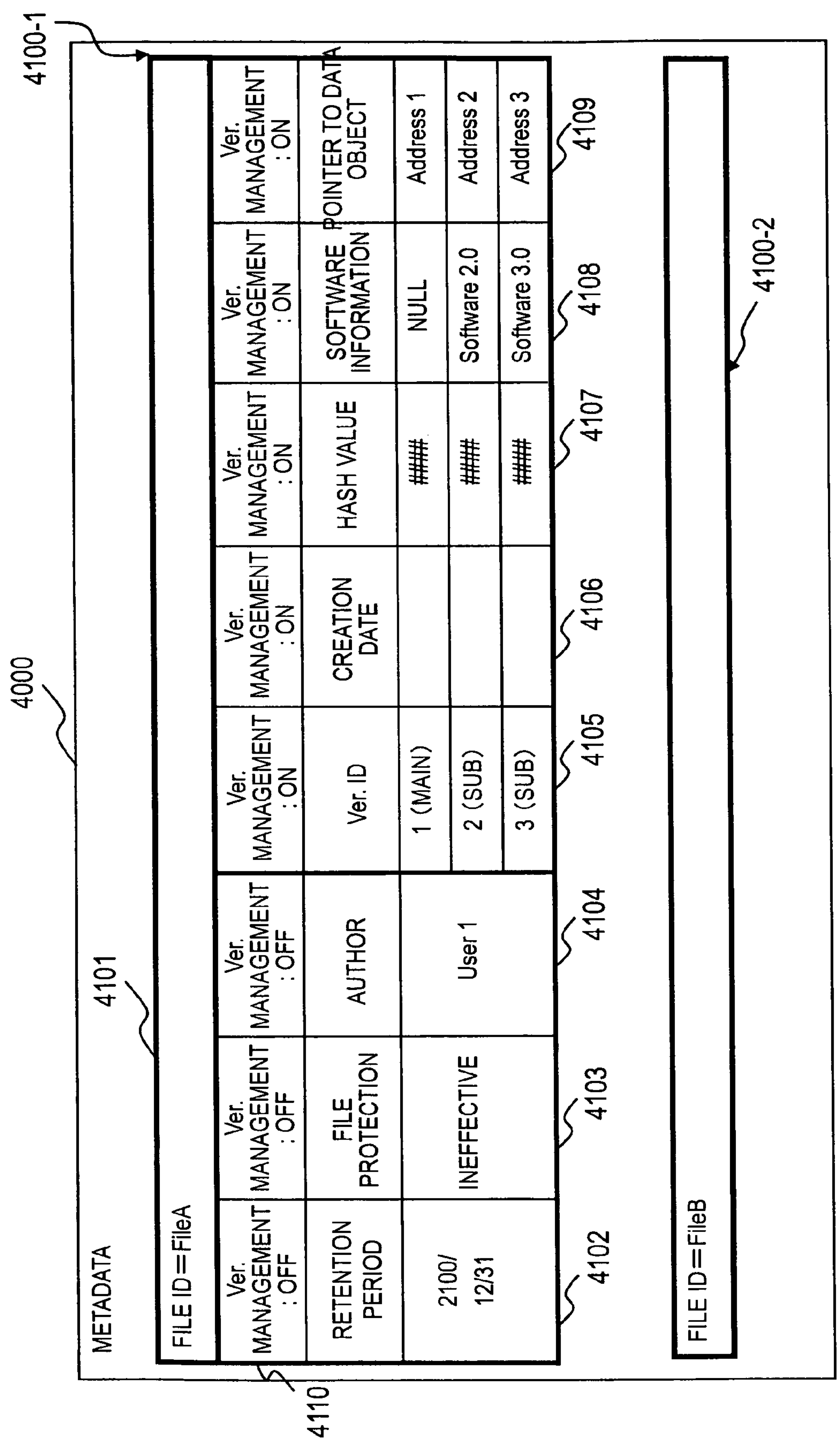
FIG. 2 is an explanatory diagram showing a structure of metadata according to the first embodiment of this invention.

FIG. 2 is an explanatory diagram showing a structure of the metadata 4000 according to the first embodiment of this invention.

The metadata 4000 is an aggregate of file-basis metadata 4100. Each piece of file-basis metadata 4100-1 and 4100-2 shown in FIG. 2 is one of a plurality of pieces of file-basis metadata 4100 contained in the metadata 4000. The two pieces of file-basis metadata 4100 are shown in FIG. 2, but the metadata 4000 may contain further more pieces of file-basis metadata 4100.

Each piece of the file-basis metadata 4100 contains attribute information on one or more files identified by one identifier (in other words, a file ID 4101 described later).

The archive storage system 1000 of this embodiment may store a file (in other words, an original file) protected against alteration and deletion and one or more files derived from the original file. The file derived from the original file represents, for example, a file (in other words, a file of a different version) created by changing the original file into a file that can be used by software (for example, the application 1105 of a different version) different from software (for example, the application 1105 of an original version) used for creating the original file.

Herein, the expression "a file is used" means that, for example, if the file contains document data, the application 1105 provides the user with a readable document based on the document data.

A plurality of files composed of the original file and one or more files derived therefrom are identified by the same file ID 4101 and mutually different version IDs 4105 described later.

The file-basis metadata 4100 contains the file ID 4101, a retention period 4102, a file protection 4103, an author 4104, the version ID 4105, a creation date 4106, a hash value 4107, software information 4108, and a pointer to data object 4109. It should be noted that the term "version" is abbreviated as "Ver" in the drawings accompanying the specification.

Described as the file ID 4101 is an identifier of a file. Any file identifier may be used as long as the file identifier is unique within the archive storage system 1000.

Described as the retention period 4102 is a termination date of a retention period of this file. The wording "this file" herein represents the file identified by the file ID 4101.

Described as the file protection 4103 is information indicating whether or not file protection against alteration and deletion is specified for this file irrespective of the information specified as the retention period 4102. In this embodiment, the file protection 4103 set to "effective" indicates that the file protection against alteration and deletion is specified, while the value "ineffective" indicates that the file protection is not specified. In other words, even after the retention period 4102 set for this file has elapsed, if the file protection 4103 is "effective", neither alteration nor deletion of this file can be executed. If the file protection 4103 of this file is "ineffective", neither alteration nor deletion of this file can be executed before the retention period 4102 set to this file has elapsed, but both the alteration and deletion can be executed after the elapse.

For example, the retention period 4102 may be specified according to a predetermined policy, and the file protection 4103 may be specified arbitrarily by the user as necessary. To be specific, in a case where, for example, a given file needs to be protected against alteration and deletion for a reason irrelevant to the predetermined policy, the user sets the file protection 4103 of the given file to "effective".

Described as the author 4104 is information indicating an author of this file.

In the example of FIG. 2, only one value is described as each of the retention period 4102, the file protection 4103, and the author 4104 corresponding to one file ID 4101. For example, "2100/12/31", "ineffective", and "User 1" are described as the retention period 4102, the file protection 4103, and the author 4104, respectively, corresponding to the value "FileA" of the file ID 4101. Those values indicate the attribute information on a plurality of files identified by the value "FileA". In other words, if the current date is prior to Dec. 31, 2100, none of those files cannot be altered or deleted, but after Dec. 31, 2100, those files can be altered and deleted. The author of those files is the user identified by the value "User 1".

However, as described later with reference to FIG. 6, of the plurality of files identified by the one file ID 4101, the association between a "sub" file (in other words, a file derived from the original file) and the file ID 4101 can be canceled. The "sub" file whose association has been canceled can be altered or deleted irrespective of the retention period 4102 and the file protection 4103.

Described as the version ID 4105 is a numerical value of a version, in other words, a number for identifying each of an original file and one or more files derived therefrom. In this embodiment, the version ID 4105 set to the value "1" means a "main" version (in other words, the original file), while the version ID 4105 set to values ("2" and "3" in the example of FIG. 2) other than the value "1" means "sub" versions (in other words, files derived from the original file).

The creation date 4106, the hash value 4107, the software information 4108, and the pointer to data object 4109, which will be described as follows, have values corresponding to each of the values ("1", "2", and "3" in the example of FIG. 2) of the version ID 4105. Those values indicate the attribute information individually set for the plurality of files identified by the one file ID 4101. Hereinafter, in the description of the creation date 4106, the hash value 4107, the software information 4108, and the pointer to data object 4109, the wording "this file" means the file identified by the file ID 4101 and the version ID 4105.

Described as the creation date 4106 is a date at which this file is written to the archive storage system 1000, or a creation date specified at the time of writing.

Described as the hash value 4107 is a hash value of this file.

Described as the software information 4108 is identification information of software (for example, the application 1105) used for creating this file.

It should be noted that the software used for creating this file may not be identical with software for using this file. For example, there is a case where this file has been created by converting a file of the "main" version by a file conversion program (not shown) running on the management computer 1200, and this file thus created is used by the application 1105 currently running on the host computer. In such a case, the identification information of the software for using this file is stored as the software information 4108.

Described as the pointer to data object 4109 is information indicating a place (location) in which a data object of this file is stored. The information indicating the place in which a data object of the file is stored may be, for example, a logical unit number (LUN) and a logical block address (LBA) that indicate the place in which the data object is stored, or may be a pointer and the like capable of uniquely identifying the address information.

It should be noted that each field of the file-basis metadata 4100 except the file ID 4101 is assigned version management ON/OFF information 4110. Described as the version management ON/OFF information 4110 is information for managing whether or not each information item contained in the file-basis metadata 4100 corresponding to the one file ID 4101 may hold a plurality of values. In this embodiment, the item with the version management ON/OFF information 4110 assigned the value "version management: OFF" is not allowed to hold a plurality of values, while the item with the value "version management: ON" can hold a plurality of values (in other words, values indicating attributes of files of each version).

In the example of FIG. 2, three versions of files are held as the files with the file ID 4101 set to "FileA". In this example, the retention period 4102, the file protection 4103, and the author 4104 cannot hold a plurality of values per file. On the other hand, the version ID 4105, the creation date 4106, the hash value 4107, the software information 4108, and the pointer to data object 4109 can hold a plurality of values per file.

To be specific, in the example of FIG. 2, the values "Software2.0" and "Address 2" are held as the software information 4108 and the pointer to data object 4109, respectively, corresponding to the value "FileA" of the file ID 4101 and the value "2" of the version ID 4105. This indicates that among the plurality of files identified by the value "FileA", a file with the version assigned the numerical value "2" (in other words, a file of the "sub" version) is used by software identified by the value "Software2.0", and the data of the file is stored in a location indicated by the value "Address 2".

Figure 3:
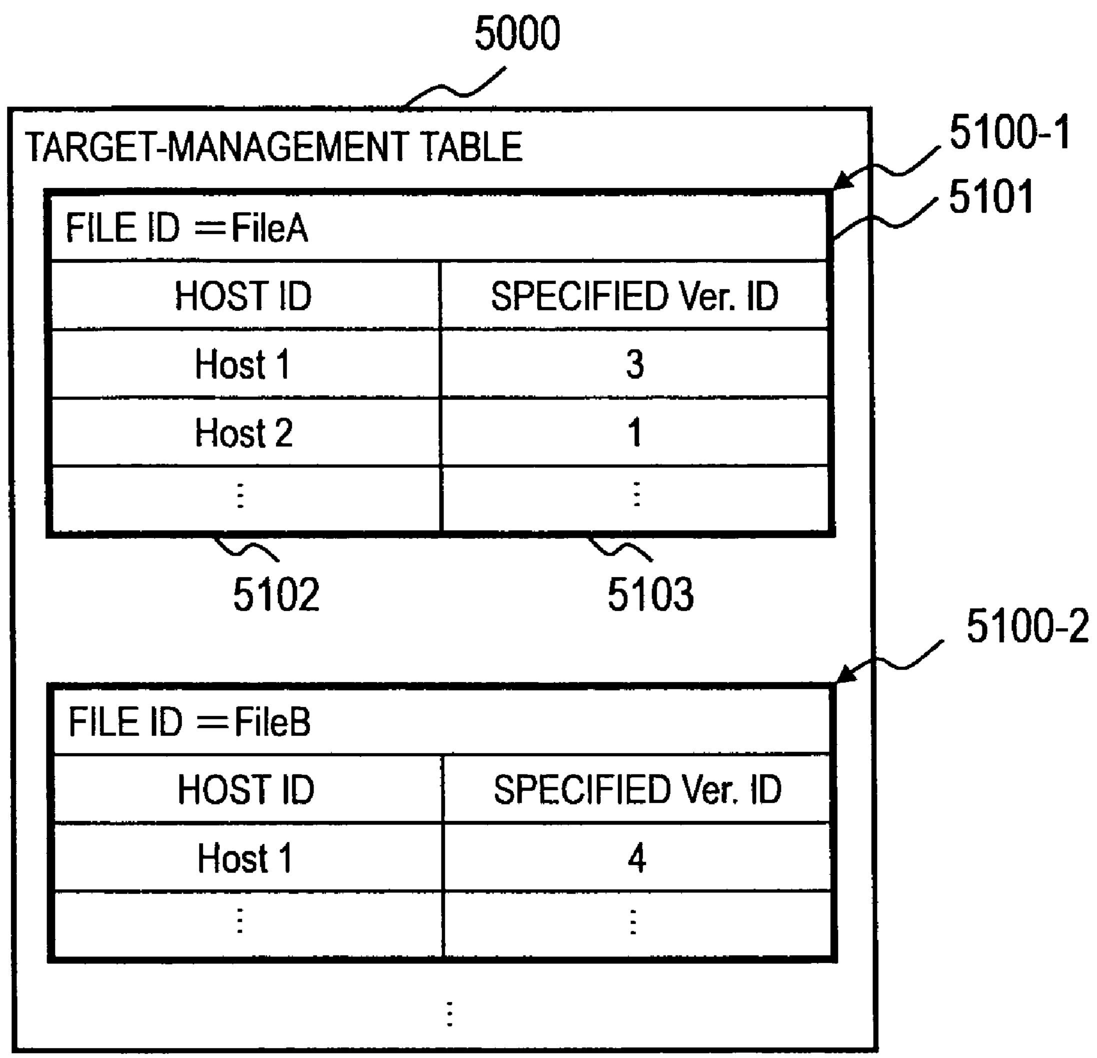
FIG. 3 is an explanatory diagram showing a structure of a target-management table according to the first embodiment of this invention.

FIG. 3 is an explanatory diagram showing a structure of the target-management table 5000 according to the first embodiment of this invention.

The target-management table 5000 is an aggregate of file-basis target-management tables 5100. Each of file-basis target-management tables 5100-1 and 5100-2 shown in FIG. 3 is one of a plurality of file-basis target-management tables 5100 contained in the target-management table 5000. The two the file-basis target-management tables 5100 are shown in FIG. 3, but the target-management table 5000 may contain further more file-basis target-management tables 5100.

Each of the file-basis target-management tables 5100 contains a file ID 5101, a host ID 5102, and a specified version ID 5103.

Described as the file ID 5101 is an identifier of a file. Any file identifier may be used as long as the file identifier is unique within the archive storage system 1000.

Described as the host ID 5102 is an identifier of the host computer 1100 that accesses the archive storage system 1000. In the example of FIG. 3, the value "Host 1" and the like are described as the host ID 5102, but instead, for example, address information (such as an IP address) of each host computer 1100 may be set as the host ID 5102.

Described as the specified version ID 5103 is a version ID indicating which one of a plurality of pieces of held file data is to be read when a read request with respect to the file identified by the file ID 5101 is received from the host computer 1100 identified by the host ID 5102.

For example, in FIG. 3, the value "Host 1" is described as the host ID 5102 of the file-basis target-management table 5100-1 with the file ID 5101 set to "FileA", and the value "3" is described as the specified version ID 5103 corresponding to the value "Host 1".

In this example, if the host computer 1100 with the host ID set to the value "Host 1" requests data of "FileA" from the archive storage system 1000, the archive storage system 1000 references the target-management table 5000 to acquire the value "3" of the specified version ID 5103 corresponding to the value "FileA" of the file ID 5101 and the value "Host 1" of the host ID 5102. Then, the archive storage system 1000 reads data from "Address 3" described as the pointer to data object 4109 with the version ID 4105 of the metadata 4100 of "FileA" set to "3" that is the same as the value of the specified version ID 5103, and the read data is returned.

The information within the target-management table 5000 may be set by any method. For example, the information may be set manually by the user. Hereinafter, a specific example of the setting method will be described.

As a specific example, a description will be made of a case where a file identified by the value "FileA" (hereinafter, referred to simply as "FileA") is newly created by given software, and the file (in other words, "FileA" of the "main" version) is stored in the archive storage system 1000. In this example, the file is accessed by the two host computers 1100, in other words, the host computer 1100 identified by the value "Host 1" and the host computer 1100 identified by the value "Host 2" (hereinafter, referred to simply as "Host 1" and "Host 2", respectively).

While the software used for creating "FileA" of the "main" version is being used by "Host 1" and "Host 2", "Host 1" and "Host 2" can use "FileA" of the "main" version by using the software. In that case, in the file-basis target-management table 5100 corresponding to "FileA", the value "1" is set as the specified version ID 5103 corresponding to the value "Host 1" and "Host 2" of the host ID 5102.

It is assumed that, for example, the software is then upgraded only on "Host 1" with the result that "Host 1" can no longer use "FileA" of the "main" version. In this case, the user creates "FileA" of the "sub" version that can be used by the upgraded software, and stores the "FileA" in the archive storage system 1000. At this time, the user transmits an instruction to update the value of the specified version ID 5103 corresponding to "Host 1" to the numerical value for identifying the created version, to the archive storage system 1000 via the management computer 1200. According to the instruction, the archive storage system 1000 updates the target-management table 5000.

For example, if the value of the specified version ID 5103 corresponding to "Host 1" is updated from "1" to "3", the archive storage system 1000 that receives a request for reference to "FileA" from "Host 1" after the update returns data of "FileA" of the "sub" version identified by the version ID "3" to "Host 1". Meanwhile, the archive storage system 1000 that receives a request for reference to "FileA" from "Host 2" after the update returns data of "FileA" of the "main" version identified by the version ID "1" to "Host 2". The above-mentioned processing will be described later by referring to FIG. 7.

Figure 4:
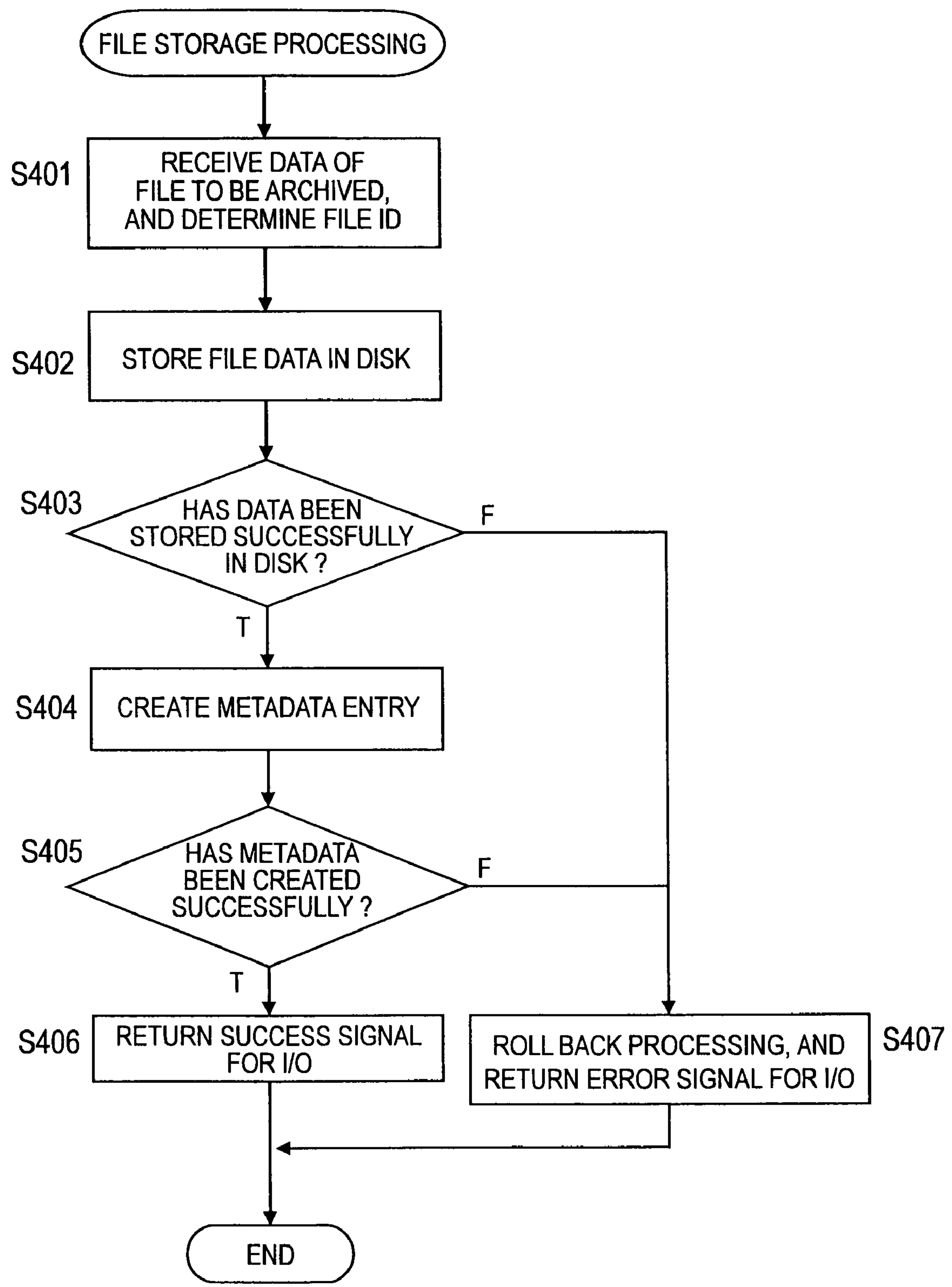
FIG. 4 is a flowchart for explaining a file archive processing executed when an archiving-management program newly receives a file write request, according to the first embodiment of this invention.

FIG. 4 is a flowchart for explaining a file archive processing executed when the archiving-management program 2201 newly receives a file write request, according to the first embodiment of this invention.

First, the archiving-management program 2201 receives a storage request along with data of a file to be archived, and determines a file ID (Step S401). It should be noted that the storage request may be a conventional write command transmitted from the host computer 1100.

Then, the archiving-management program 2201 stores the received data of the file in the storage subsystem 3000 (Step S402).

Subsequently, the archiving-management program 2201 judges whether or not the data has been stored successfully in the storage subsystem 3000 in Step S402 (Step S403). In a similar manner to a conventional data storage processing, the judgment may be made based on whether or not a so-called acknowledgement (ACK) has been received from the storage subsystem 3000.

If the judgment of Step S403 results in TRUE (in other words, the data is stored successfully), a new entry (in other words, new file-basis metadata 4100) is created in the metadata 4000 corresponding to the determined file ID. In this case, since the data is newly stored, the created entry is set as follows.

As the file ID 4101, the determined file ID is set. As the retention period 4102, a termination date of a default retention period may be set in advance, or a termination date of a retention period inputted simultaneously with the storage request for the file may be set. In this embodiment, the termination date of the retention period is inputted simultaneously with the storage request for the file. In other words, a specified termination date of a retention period is set as the retention period 4102 of the file.

As the file protection 4103, the value “effective” is set in a case where, for example, file protection is set for the whole archive storage system 1000 or a directory or the like that stores the file, otherwise the value “ineffective” is set.

Set as the author 4104 is information for identifying an author of the file on the host computer 1100. The version ID 4105 is set to the value “1” since the data is newly stored as a “main” version. Set as the creation date 4106 is a date at which this file is written in the archive storage system 1000, or a creation date specified upon the writing. Further, a hash value is generated for the stored file, and the value is set as the hash value 4107. The software information 4108 is set to the value “NULL” that indicates a default since the data is newly stored as a “main” version. Set as the pointer to data object 4109 is information for identifying a place where the data is stored in Step S402 (Step S404).

Subsequently, the archiving-management program 2201 judges whether or not the complete metadata has been created successfully in Step S404 (Step S405).

If the judgment of Step S405 results in TRUE (in other words, the metadata is created successfully), the archiving-management program 2201 completes the I/O as a success in storing the file (Step S406). At this time, the archiving-management program 2201 transmits information indicating that the file has been stored successfully to the host computer 1100.

If the judgment of Step S403 results in FALSE (in other words, the data fails to be stored), or if the judgment of Step S405 results in FALSE (in other words, the metadata fails to be created), the archiving-management program 2201 rolls back all of the processing steps involved in this file archive request, and completes the I/O as a failure in storing the file (Step S407). At this time, the archiving-management program 2201 transmits information indicating that the file has failed to be stored to the host computer 1100.

Figure 12:
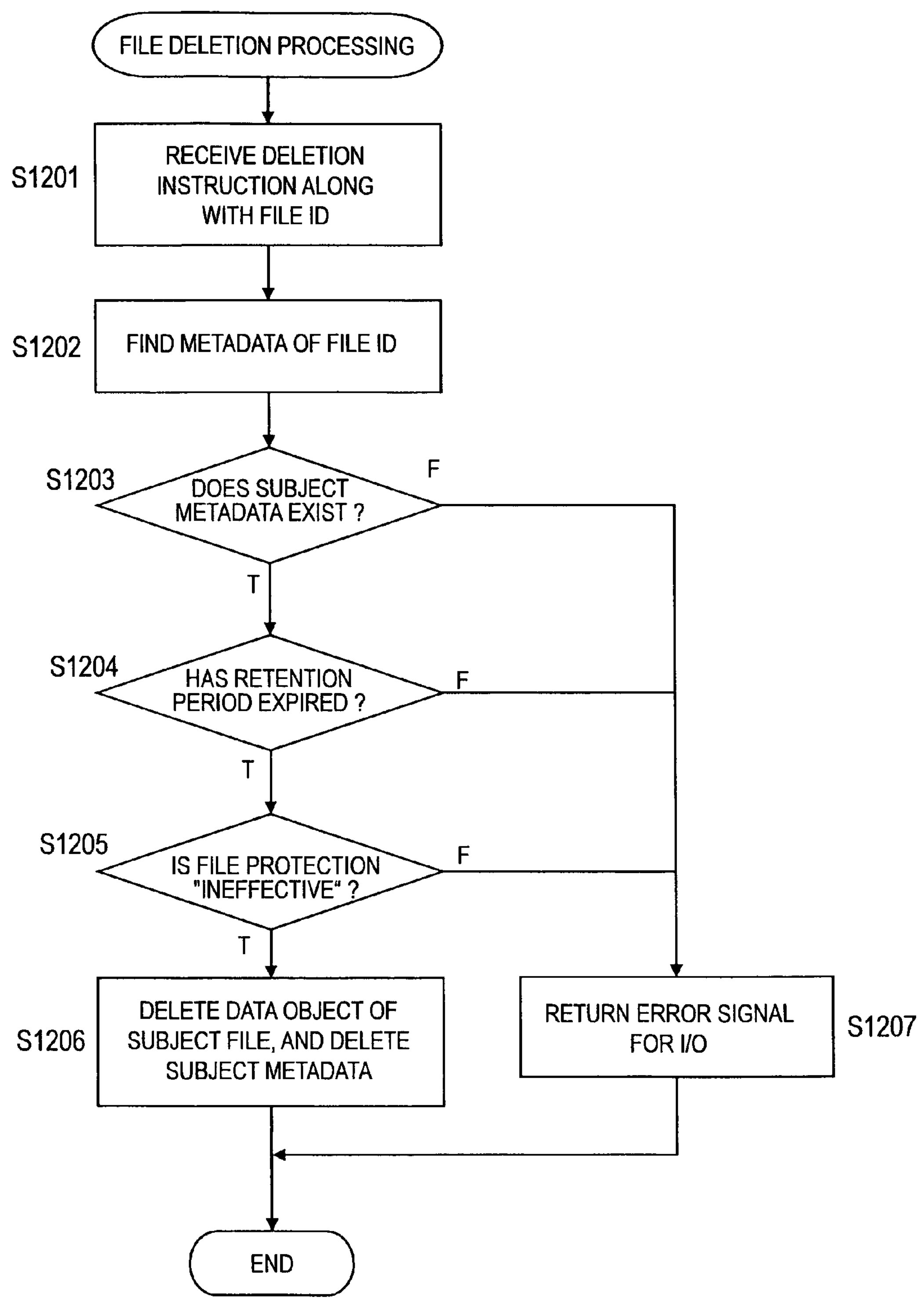
FIG. 12 is a flowchart for explaining a file deletion processing according to the first embodiment of this invention.

Next, a description will be made of an operation for protection based on a protection policy for a file in the archive storage system. FIG. 12 will be used to describe a flow of a deletion processing for the file.

FIG. 12 is a flowchart for explaining a file deletion processing according to the first embodiment of this invention.

First, the archiving-management program 2201 receives a deletion request with the specified file ID of a file to be deleted (Step S1201). It should be noted that the deletion request may be a conventional write command transmitted from the host computer 1100.

Then, the archiving-management program 2201 searches for the file-basis metadata 4100 corresponding to the inputted file ID (Step S1202).

Subsequently, the archiving-management program 2201 judges whether or not the file-basis metadata 4100 has been found in Step S1202 (Step S1203).

If the judgment of Step S1203 results in TRUE, the archiving-management program 2201 confirms whether or not the retention period 4102 has elapsed (Step S1204).

If the judgment of Step S1204 results in TRUE, the archiving-management program 2201 confirms whether or not the file protection 4103 is “ineffective” (Step S1205).

If the judgment of Step S1205 results in TRUE, the archiving-management program 2201 permits the deletion processing for the subject file. In other words, the archiving-management program 2201 deletes a data object of the subject file, and further deletes the subject metadata entry (Step S1206).

If the judgment of any one of Steps S1203 to S1205 results in FALSE, the archiving-management program 2201 inhibits the file deletion. In other words, the archiving-management program 2201 returns an error signal in response to the deletion request (Step S1207).

By referring to FIG. 12, the description has been made hereinabove of the deletion processing executed when the file deletion is requested. If alteration of the data object of the file is requested, an alteration processing is executed. In a similar manner to the deletion processing, the execution of the alteration processing is permitted if the subject metadata exists, if the retention period has elapsed, and if the file protection is “ineffective”.

As described above, the file is protected against data tampering based on the protection policy.

Figure 5:
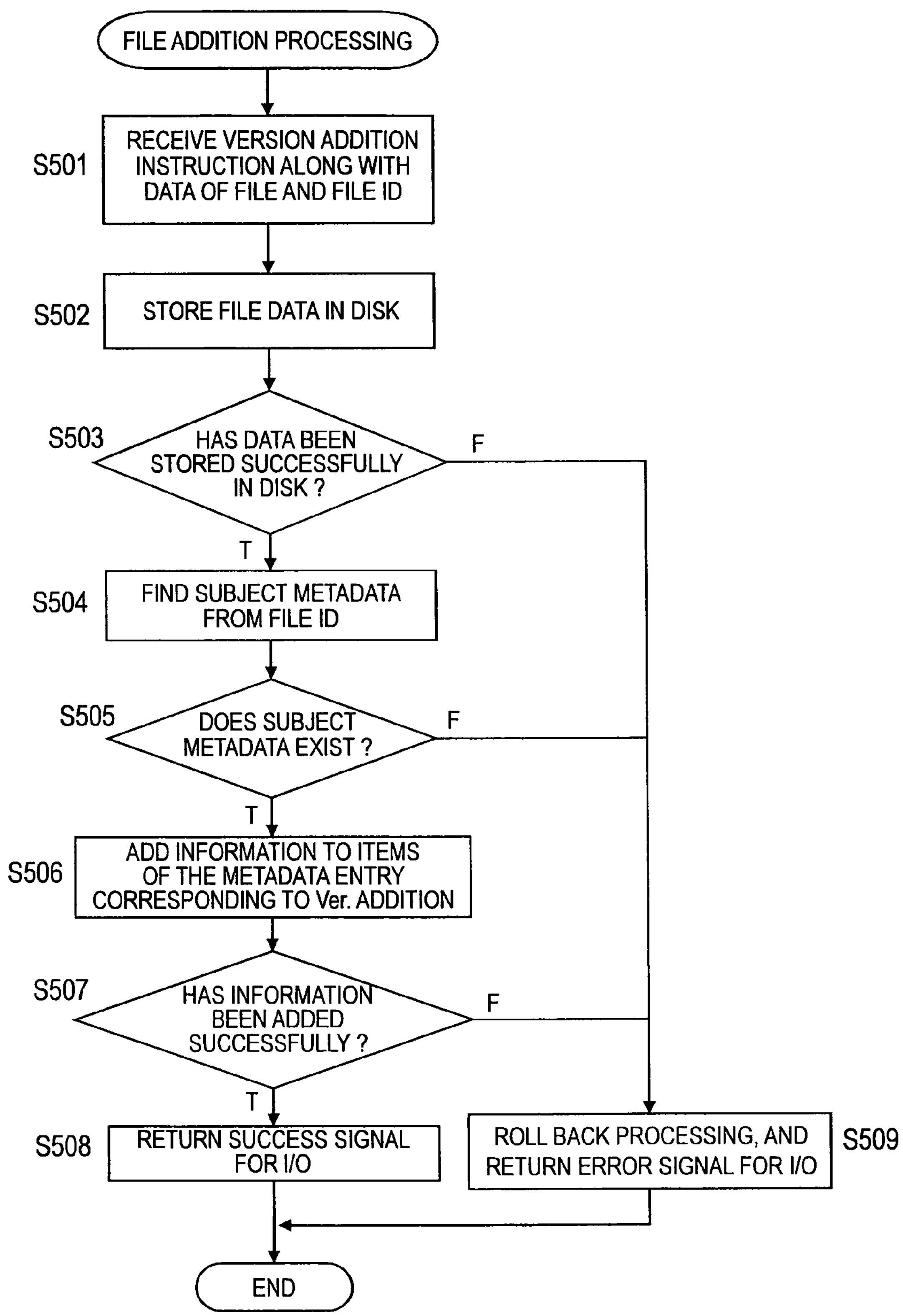
FIG. 5 is a flowchart for explaining a version addition processing executed when the archiving-management program receives a request to write a file with a specified version, according to the first embodiment of this invention.

FIG. 5 is a flowchart for explaining a version addition processing executed when the archiving-management program 2201 receives a request to write a file with a specified version, according to the first embodiment of this invention.

First, the archiving-management program 2201 receives a storage request with the specified file ID, version, and software information along with data of a file to be archived (Step S501).

It should be noted that the storage request may be a dedicated command transmitted from the management computer 1200. For example, if software (for example, the application 1105) used for creating a given archived file (for example, “FileA”) is upgraded, the file conversion program of the management computer 1200 may create “FileA” of the new version that can be used by the new application 1105 according to the instruction from the user. The data or the like thus created is transmitted from the management computer 1200 to the archive storage system 1000 in Step S501.

Then, the archiving-management program 2201 stores the received data of the file in the storage subsystem 3000 (Step S502).

Subsequently, the archiving-management program 2201 judges whether or not the data has been stored successfully in the storage subsystem 3000 in Step S502 (Step S503).

If the judgment of Step S503 results in TRUE, the archiving-management program 2201 searches for the file-basis metadata 4100 corresponding to the inputted file ID (Step S504).

Subsequently, the archiving-management program 2201 judges whether or not the file-basis metadata 4100 has been found in Step S504 (Step S505).

If the judgment of Step S505 results in TRUE, the archiving-management program 2201 adds information belonging to the version to the found file-basis metadata 4100. In other words, the archiving-management program 2201 adds information to items of the metadata entry with the version management ON/OFF information 4110 set to "version management: ON". In the example shown in FIG. 2, the numerical value of the version specified in Step S501 is added as the version ID 4105. Then, the creation date 4106, the hash value 4107, the software information 4108, and the pointer to data object 4109 are set in correspondence with the added version ID 4105. It should be noted that if the version is not specified in Step S501, the number subsequent to the greatest value among the values already set as the version ID 4105 is added (Step S506).

Subsequently, the archiving-management program 2201 judges whether or not the addition to the metadata is successful in Step S506 (Step S507). For example, if the specified version already exists, the addition to the metadata is failed.

If the judgment of Step S507 results in TRUE, the archiving-management program 2201 completes the I/O as a success in storing the file (Step S508). At this time, the archiving-management program 2201 transmits information indicating that the file has been stored successfully to the management computer 1200. In this case, as described by referring to FIG. 3, the target-management table 5000 may be updated as well.

If the judgment of Step S503 results in FALSE, if the judgment of Step S505 results in FALSE, or if the judgment of Step S507 results in FALSE, the archiving-management program 2201 rolls back all of the processing steps involved in this file archive request, and completes the I/O as a failure in storing the file (Step S509). At this time, the archiving-management program 2201 transmits information indicating that the file has failed to be stored to the management computer 1200.

Figure 6:
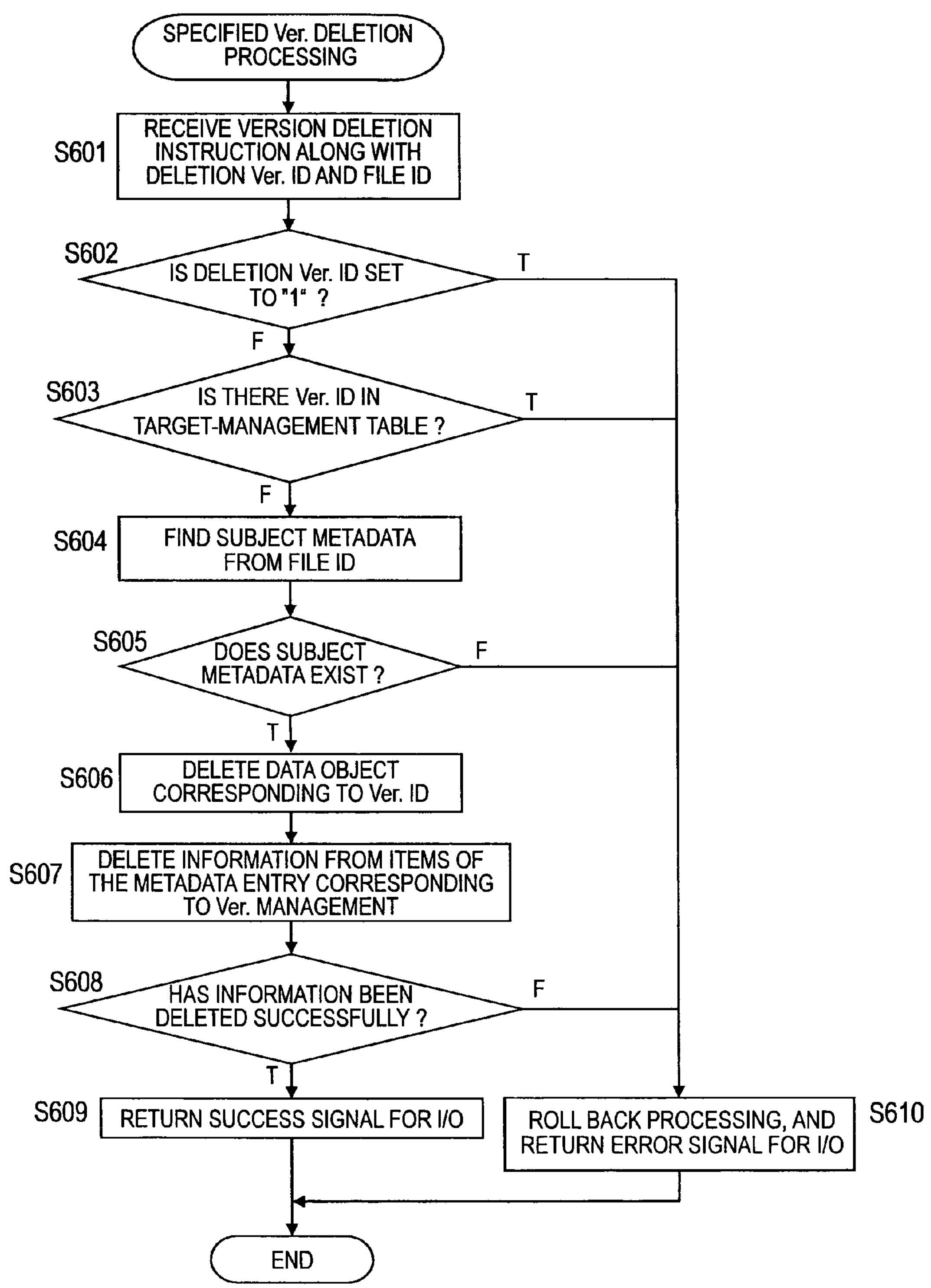
FIG. 6 is a flowchart for explaining a specified version deletion processing executed when the archiving-management program receives a request to delete a file with a specified version, according to the first embodiment of this invention.

FIG. 6 is a flowchart for explaining a specified version deletion processing executed when the archiving-management program 2201 receives a request to delete a file with a specified version, according to the first embodiment of this invention.

First, the archiving-management program 2201 receives a deletion request with the specified file ID and version of a file to be deleted (Step S601). It should be noted that the deletion request may be a dedicated command transmitted from the management computer 1200.

Subsequently, the archiving-management program 2201 judges whether or not the version specified in the deletion request is set to "1" (Step S602).

If the judgment of Step S602 results in FALSE, the file of the "sub" version is specified as a deletion subject. In this case, the archiving-management program 2201 judges whether or not information on the specified version ID 5103 of the specified version exists in the target-management table 5100 containing the specified file ID (Step S603).

If the judgment of Step S603 results in FALSE (in other words, the information on the specified version ID 5103 of the specified version does not exist), at the time instant, there exists no host computer 1100 that may reference the file of the specified version. In other words, even if the file of the specified version is deleted, the host computer 1100 can reference the specified file. In this case, the archiving-management program 2201 searches for the file-basis metadata 4100 corresponding to the inputted file ID (Step S604).

Subsequently, the archiving-management program 2201 judges whether or not the file-basis metadata 4100 has been found in Step S604 (Step S605).

If the judgment of Step S605 results in TRUE, the archiving-management program 2201 deletes data indicated by the pointer to data object 4109 of the found file-basis metadata 4100 (Step S606). To be specific, the archiving-management program 2201 deletes data indicated by the pointer to data object 4109 corresponding to the specified version ID 4105 among the pointers to data object 4109 of the found file-basis metadata 4100.

Then, the archiving-management program 2201 deletes the information belonging to the version from the found file-basis metadata 4100 (Step S607). In other words, the version management ON/OFF information 4110 deletes, from the information set as the items of the metadata entry with the version management ON/OFF information 4110 set to "version management: ON", the values of the items corresponding to the specified version ID 4105 (in the example of FIG. 2, the creation date 4106, the hash value 4107, the software information 4108, and the pointer to data object 4109). The deletion cancels the association between the specified file ID and the file data of the version indicated by the specified version ID 4105.

Subsequently, the archiving-management program 2201 judges whether or not the deletion processing of Steps S606 and S607 is successful (Step S608).

If the judgment of Step S608 results in TRUE, the archiving-management program 2201 completes the I/O as a success in deleting the specified version (Step S609). At this time, the archiving-management program 2201 transmits information indicating that the deletion is successful to the management computer 1200.

If the judgment of Step S602 results in TRUE, the file of the "main" version is specified as the deletion subject. However, the file of the "main" version cannot be deleted unless the retention period 4102 set for the file has already terminated and unless the file protection 4103 is set to "ineffective". Since the specified version deletion processing shown in FIG. 6 is only for deleting the file of the "sub" version, if the judgment of Step S602 results in TRUE, the archiving-management program 2201 rolls back all of the processing steps involved in this deletion request, and completes the I/O as a failure in deleting the file (Step S610). At this time, the archiving-management program 2201 transmits information indicating that the file has failed to be deleted to the management computer 1200.

If the judgment of Step S603 results in TRUE, at the time instant, there exists the host computer 1100 that can reference the file of the specified version. In other words, if the file of the specified version is deleted, at least one host computer 1100 becomes unable to reference the specified file. In order to prevent this, if the judgment of Step S603 results in TRUE, the file of the specified version is not deleted, and the procedure advances to Step S610.

If the judgment of Step S605 results in FALSE, or if the judgment of Step S608 results in FALSE, the procedure also advances to Step S610.

Figure 7:
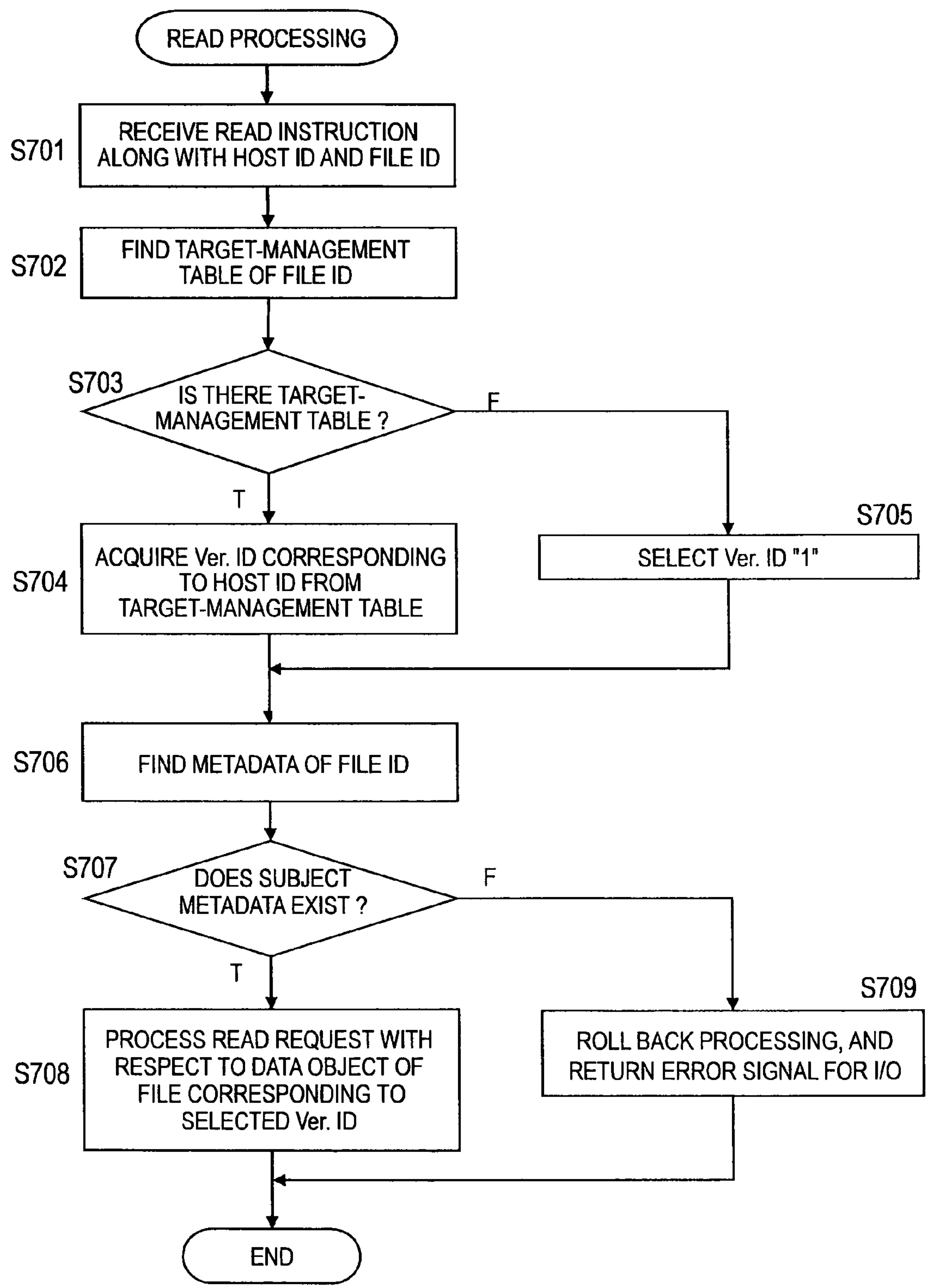
FIG. 7 is a flowchart for explaining a reference processing executed when the archiving-management program receives a file read request from the host computer, according to the first embodiment of this invention.

FIG. 7 is a flowchart for explaining a reference processing executed when the archiving-management program 2201 receives a file read request from the host computer 1100, according to the first embodiment of this invention.

First, the archiving-management program 2201 receives a reference request along with the file ID of a file to be referenced and the host ID for identifying the host computer 1100 of a request source (Step S701). It should be noted that the reference request may be a conventional read command transmitted from the host computer 1100.

For example, if the data network 1300 is an IP network, the IP address that indicates a transmission source of the reference request may be used as the host ID of the request source.

Then, the archiving-management program 2201 searches for the file-basis target-management table 5100 corresponding to the inputted file ID (Step S702).

Subsequently, the archiving-management program 2201 judges whether or not the file-basis target-management table 5100 has been found in Step S702 (Step S703).

If the judgment of Step S703 results in TRUE, the archiving-management program 2201 selects a value corresponding to the same host ID 5102 as the inputted host ID from among the values of the specified version ID 5103 within the found file-basis target-management table 5100 (Step S704).

If the judgment of Step S703 results in FALSE, there exists no sub version file derived from a main version file of the file whose reference has been requested. In this case, the archiving-management program 2201 selects the value "1" representing "main" as the version ID (Step S705).

Then, the archiving-management program 2201 searches for the file-basis metadata 4100 corresponding to the inputted file ID (S706).

Subsequently, the archiving-management program 2201 judges whether or not the file-basis metadata 4100 has been found in Step S706 (Step S707).

If the judgment of Step S707 results in TRUE, the archiving-management program 2201 references data of the file indicated by the pointer to data object 4109 corresponding to the selected version ID in the found file-basis metadata 4100 (Step S708).

If the judgment of Step S707 results in FALSE, the archiving-management program 2201 rolls back all of the processing steps involved in this reference request, and completes the I/O as a failure in referencing the file (Step S709). At this time, the archiving-management program 2201 transmits information indicating that the file has failed to be referenced to the host computer 1100.

After that, the processing is brought to an end.

As described above, according to the first embodiment of this invention, a plurality of files that are derived from one (original) file and are of mutually different versions have the attribute information held in association with one another. Further held is information (the target-management table 5000) in which each version is associated with the host computer 1100 that uses the version. Upon reception of a reference request for a file from the host computer 1100, the archive storage system 1000 returns data of the file of the version associated with the host computer 1100 of the request source. Accordingly, the host computer 1100 can access a file by using a conventional access command without concern for the version.

As a modified example of the first embodiment described above, the processing of selecting the version of the file to be referenced may be executed based on information for identifying software instead of the host ID. This modified example will be described next.

Figure 8:
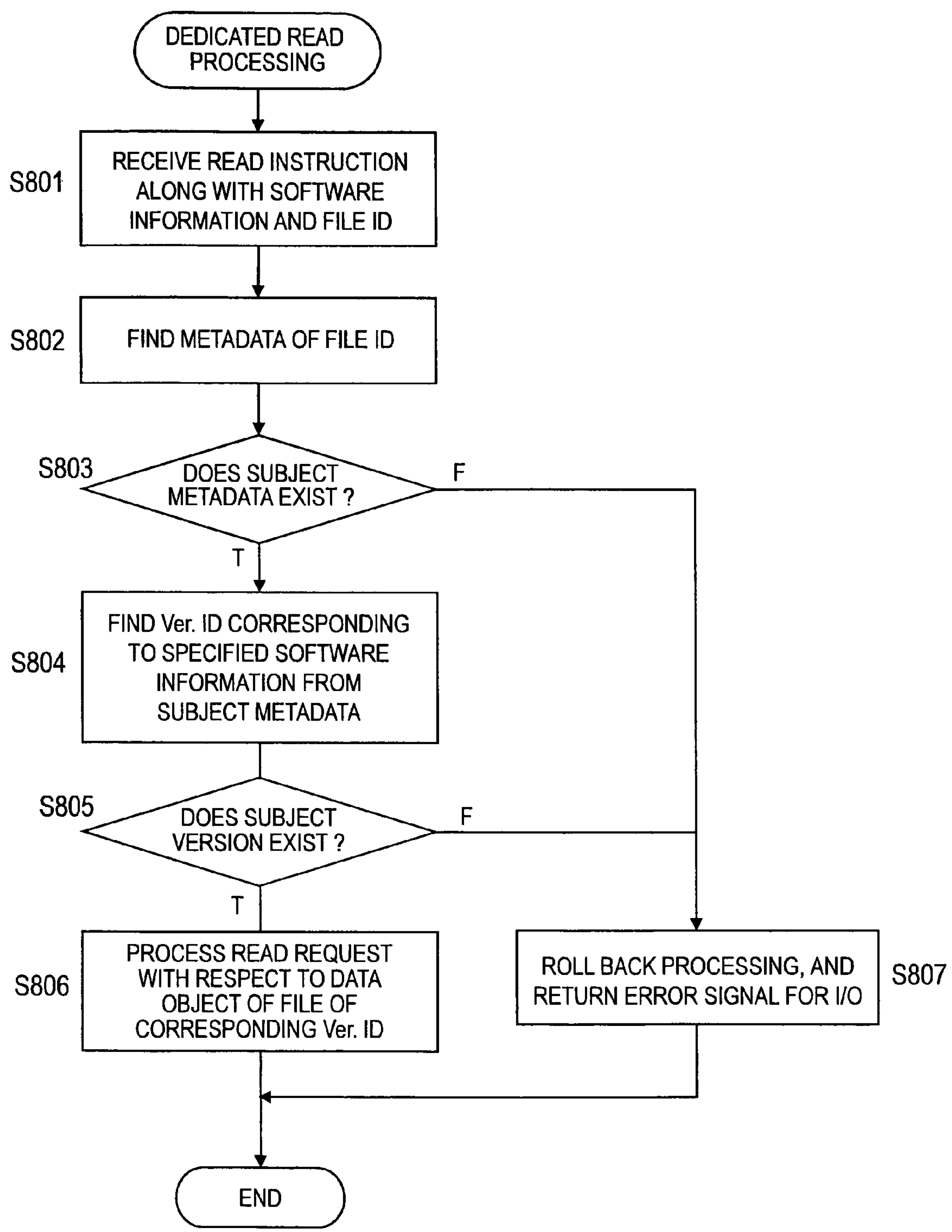
FIG. 8 is a flowchart for explaining the modified example of a dedicated reference processing executed by the archiving-management program according to the first embodiment of this invention.

FIG. 8 is a flowchart for explaining the modified example of a dedicated reference processing executed by the archiving-management program 2201 according to the first embodiment of this invention.

First, the archiving-management program 2201 receives a reference request along with the file ID of a file to be referenced and the information for identifying the software that uses the file from the host computer 1100 (Step S801). It should be noted that in order to exchange the information for identifying the software that uses the file between the host computer 1100 and the archiving-management program 2201, an application program interface (API) to be used for the exchange needs to be prepared.

Then, the archiving-management program 2201 searches for the file-basis metadata 4100 corresponding to the inputted file ID (Step S802).

Subsequently, the archiving-management program 2201 judges whether or not the file-basis metadata 4100 has been found in Step S802 (Step S803).

If the judgment of Step S803 results in TRUE, the archiving-management program 2201 searches the found file-basis metadata 4100 for the version ID 4105 corresponding to the same software information 4108 as the identification information of the software received in Step S801 (Step S804).

Subsequently, the archiving-management program 2201 judges whether or not the version ID 4105 has been found in Step S804 (Step S805).

If the judgment of Step S805 results in TRUE, there exists the file of the version that can be used by the specified software. In this case, the archiving-management program 2201 references the data of the file indicated by the pointer to data object 4109 corresponding to the found version ID 4105 (Step S806).

If the judgment of Step S803 results in FALSE, there exists no attribute information on the file whose reference has been requested. In this case, the archiving-management program 2201 completes the I/O as a failure in referencing the file (Step S807). In Step S807, the archiving-management program 2201 transmits information indicating that the reference has failed to the host computer 1100.

If the judgment of Step S805 results in FALSE, there exists no file of the version that can be used by the specified software. Also in this case, the archiving-management program 2201 rolls back all of the processing steps involved in this reference request, and completes the I/O as a failure in referencing the file (Step S807).

It should be noted that in a case where the processing shown in FIG. 7 is not executed and only the processing shown in FIG. 8 is executed in response to the reference request, the archive storage system 1000 does not need to hold the target-management table 5000.

Next, a description will be made of a second embodiment of this invention. The second embodiment is the same as the first embodiment except for differences described as follows.

In the first embodiment, the version addition processing is performed as necessary. On the other hand, for example, the management computer 1200 may be provided with a collective file update program, and the archiving-management program 2201 may have a list extraction function of searching for update candidates for the collective file update processing. Such an embodiment will be described as the second embodiment.

The computer system of this embodiment has the same configuration as the first embodiment except that the collective file update program and the file conversion program are stored in the memory 1202 of the management computer 1200, which are executed by the CPU 1201. Further, the archiving-management program 2201 of this embodiment executes a list extraction processing shown in FIG. 9 in addition to the processings described in the first embodiment.

For example, in a case where a large number of files created by given software (for example, the application 1105) running on the host computer 1100 are stored in the archive storage system 1000, if the software is upgraded, new versions of the large number of stored files need to be created. The list extraction processing is a processing of creating a list of files for which new versions need to be created in such a case and transmitting the list to the management computer 1200.

Figure 9:
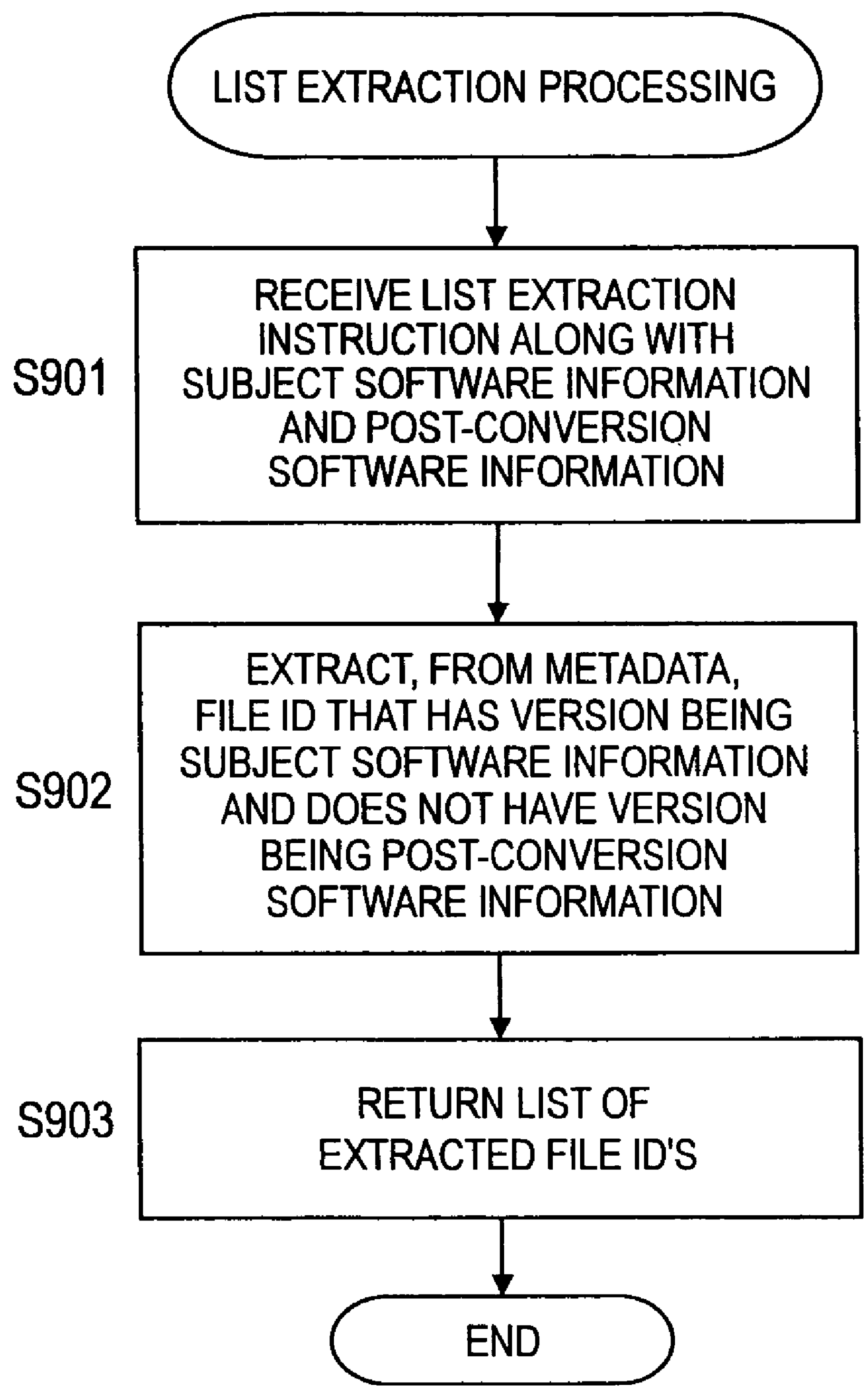
FIG. 9 is a flowchart for explaining a list extraction processing executed when the archiving-management program receives a list extraction request from a management computer, according to a second embodiment of this invention.

FIG. 9 is a flowchart for explaining the list extraction processing executed when the archiving-management program 2201 receives a list extraction request from the management computer 1200, according to the second embodiment of this invention.

First, the archiving-management program 2201 receives a list extraction request along with subject software information and post-change software information (Step S901). Herein, the subject software information represents information for identifying software before a change (for example, information indicating a version before a change), and the post-change software information represents information for identifying software after the change (for example, information indicating a version after the change).

Then, the archiving-management program 2201 references the metadata 4000 to extract therefrom the file ID 4101 of the file-basis metadata 4100 that contains the subject software information as the software information 4108 and does not contain the post-change software information as the software information 4108 (Step S902).

Subsequently, the archiving-management program 2201 returns the list of file IDs 4101 extracted in Step S902 in response to the list extraction request (Step S903).

After that, the list extraction processing is brought to an end.

For example, if the application 1105 of the host computer 1100 is upgraded from "Software2.0" to "Software3.0", in Step S901, "Software2.0" is specified as the subject software information, and "Software3.0" is specified as the post-change software information.

In this case, it is necessary to create a file that can be used by "Software3.0" by converting a file that is used by "Software2.0". However, there is no need to convert a file that is not used by "Software2.0". Also in a case where the file that can be used by "Software3.0" has already been created, there is no need to create a new converted file. Therefore, in Step S902, the archiving-management program 2201 extracts the file ID 4101 of the file-basis metadata 4100 that contains "Software2.0" as the software information 4108 and does not contain "Software3.0".

It should be noted that in this embodiment, the software information 4108 has been described as a keyword for the extraction, but if an extension of a file is held in the metadata 4000 for each version, the file ID may be extracted based on the extension. In this case, a subject extension and a post-change extension are specified in Step S901, and in Step S902, the file ID 4101 of the file-basis metadata 4100 that contains the subject extension and does not contain the post-change extension.

The collective file update program transmits a list extraction request to the archive storage system 1000 with the specified software information of software subject to the conversion performed by the file conversion program. Then, the file conversion program executes the file conversion with respect to the file list returned by the list extraction processing. Subsequently, the management computer 1200 transmits a version addition instruction to the archive storage system 1000 with the specified file after the conversion (in other words, the file of a newly created version). According to this instruction, as shown in FIG. 5, the archive storage system 1000 executes the version addition processing. Accordingly, data of the files of the sub version can be added collectively to the files of the old version.

For example, in a large-scale system including a large number of host computers 1100, the upgrade is not collectively performed on the applications 1105 due to the work load, and may be performed on each group of host computers 1100. In that case, until the upgrade of the applications 1105 of all of the host computers 1100 is finished, a plurality of versions are used by the plurality of host computers 1100. Even in that case, the addition of the data of the files of the sub version for the upgrade can be performed collectively on the data of the plurality of files stored in the archive storage system 1000 by the procedure shown in this embodiment. Also in that case, after the data of the files of the sub version are added collectively, in the target-management table, the specified version ID 5103 corresponding to the host ID 5102 of the host computer 1100 having the application upgraded can be switched to thereby switch the access destination to the data of the files of the sub version after the upgrade.

Next, a description will be made of a third embodiment of this invention. The third embodiment is the same as the first and second embodiments except for differences described as follows.

In the first and second embodiments of this invention, the version management ON/OFF information 4110 of the metadata 4000 is fixed. On the other hand, in the third embodiment, the user can define the changeability of the version management ON/OFF information 4110.

Figure 10:
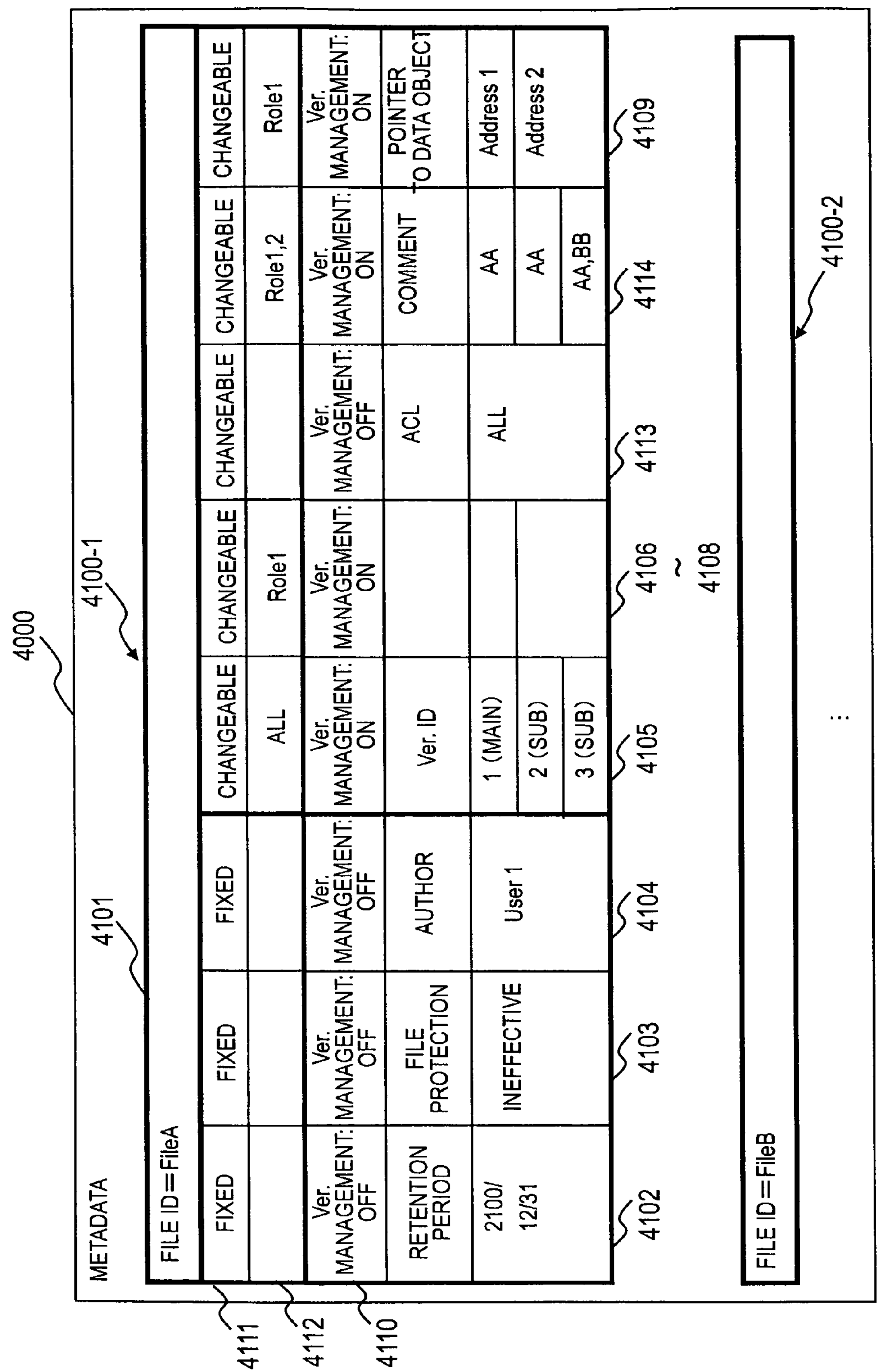
FIG. 10 is an explanatory diagram showing a structure of the metadata according to a third embodiment of this invention.

FIG. 10 is an explanatory diagram showing a structure of the metadata 4000 according to the third embodiment of this invention.

The metadata 4000 of the third embodiment has the same structure as the metadata 4000 of the first and second embodiments except that changeability information 4111 and change permittee information 4112 are added along with the addition of an access control list (ACL) 4113 and a comment 4114 as information indicating attributes.

Described as the changeability information 4111 is information for controlling whether or not the value of the version management ON/OFF information 4110 can be changed to "version management: ON". In this embodiment, the changeability information 4111 set to the value "fixed" indicates that the version management ON/OFF information 4110 is fixed to the value "version management: OFF" and cannot be changed, while the changeability information 4111 set to the value "changeable" indicates that the version management ON/OFF information 4110 can be changed between the values "version management: OFF" and "version management: ON".

It should be noted that, for example, when the system is built up, the version management ON/OFF information 4110 with the changeability information 4111 set to "changeable" is set by a system administrator to one of the values "version management: OFF" and "version management: ON".

Described as the change permittee information 4112 is information for identifying the user that can add information related to the "sub" version to the items of the metadata with the changeability information 4111 set to "changeable". In this embodiment, if the change permittee information 4112 is set to the value "Role1", the user given a role called "Role1" can change the information related to the "sub" version while maintaining information of the other items as before.

For the detailed description, the ACL 4113 and the comment 4114 are added as information held in the metadata 4000.

The ACL 4113 is used for controlling whether or not file data is to be accessed. To be specific, for example, information for identifying the user that is permitted to access the file data may be held in the ACL 4113. The value "ALL" shown in FIG. 10 indicates that all of the users are permitted to access the file data.

The comment 4114 is an item for holding supplementary information appended to the file data by the user. For example, an arbitrary character string specified by the user may be held as the comment 4114.

FIGS. 11A to 11C are explanatory diagrams of an example of states of the metadata 4000 in the case where the data is added, according to the third embodiment of this invention.

FIG. 11A shows the file-basis metadata 4100 in a case where file data is newly archived (in other words, in a case where data of a new file of the "main" version is stored). It should be noted that the items such as the file ID 4101 which are unnecessary for a description of the changes in state are omitted from the figures. With regard to this file, the retention period terminates at "2001/12/31", there is no file protection, the account "User 1" is the author, the value "All" is set to indicate that all of the users can access the data object, the comment sentence "AA" is appended, and the data object is stored in "Address 1" of the storage subsystem. The metadata is created to include those as data relating to the file of the main version.

FIG. 11B shows the file-basis metadata 4100 in a case where the user authorized as "Role1" adds data of the file of the sub version to the file created in FIG. 11A.

The version management is not performed on the retention period 4102, the file protection 4103, the author 4104, and the ACL 4113, for which the version management ON/OFF information 4110 is set to "version management: OFF". On the other hand, the information is added to the version ID 4105 to the software information 4108 and the pointer to data object 4109, for which "Role1" is granted a change permission.

FIG. 11C shows the file-basis metadata 4100 in a case where after the data is added as shown in FIG. 11B, the user authorized as "Role2" further adds information relating to data of the file of the sub version.

The information is not added to the retention period 4102, the file protection 4103, the author 4104, and the ACL 4113, for which the version management ON/OFF information 4110 is set to "version management: OFF". On the other hand, the information relating to the data of the file of the sub version is not added to the creation date 4106 to the software information 4108 and the pointer to data object 4109, for which "Role2" is not granted a change permission. The information is added to the comment 4114 and the version ID 4105, for which "Role2" is granted a change permission.

The embodiments of this invention have been described above, but a GUI or script for defining the target-management table 5000 may be prepared to define the target-management table 5000 via the management computer 1200. In that case, for example, in cooperation with a software management program or the like for collecting application information on the host computer, the upgrade of the application of the host computer may be detected, and with this as a trigger, the corresponding information of the target-management table 5000 may be updated.

Further, the information on the plurality of versions is held in the description of the embodiments of this invention. However, in a case where the contents have been retained for a long period of time, the data of the file of the old versions of the application may no longer be used. In this case, the specified version deletion processing for deleting data items added as "sub" may be used to delete the information on the versions that are no longer used, thereby improving efficiency in using the storage area of the storage subsystem. To be specific, the user is caused to specify how many sub data items of the latest version ID indicating the new data are to be held, and sub data items other than the specified number of latest sub data items are deleted at regular check triggers or the like.

Further, for the improvement of efficiency in using the storage area of the storage subsystem, the embodiment of this invention may be combined with a hierarchical management technology to migrate data other than the number (specified by the user) of latest sub data items and the main data items to a tape device or the like at regular check triggers or the like.

Further, for the improvement of efficiency in using the storage area of the storage subsystem, the embodiment of this invention may be combined with a differential copy function to hold only a difference between the sub data object and the main data object.

Further, in the description of the embodiments of this invention, the system is used at a site where the archive storage system is a main system. However, data may be replicated by remote replication between a main system at the site where the archive storage system is a main system and a subsystem at the recovery site. In that case, further for the improvement of efficiency in using the storage area of the storage subsystem, all of the versions may be held in the main system, while only the number (specified by the user) of latest sub data items and the main data items may be held in the subsystem.

According to the embodiment of this invention described above, in a case of retaining a file without tampering for a long period of time, the main data to be retained without tampering and the sub data for subsidiary use such as file reference are associated with each other, and are retained so as to conform to the same protection policy. To be more specific, in a case where a request for reference to a file is issued, any one of the main data and sub data corresponding to the file is returned. Further, the same protection policy (for example, retention period) is set for the main data and sub data. Before the elapse of the retention period, none of the main data and sub data corresponding to the file can be changed. However, even before the elapse of the retention period, the association between the file and the sub data can be canceled. The sub data whose association with the file has been canceled may be deleted. By deleting the sub data low in necessity, it is possible to improve the efficiency in using the storage area.

While the present invention has been described in detail and pictorially in the accompanying drawings, the present invention is not limited to such detail but covers various obvious modifications and equivalent arrangements, which fall within the purview of the appended claims.

What is claimed is:

1. A storage system coupled to one or more computers, comprising:

a storage device for providing a storage area for data; and a controller for controlling data to be written to and read from the storage area, wherein the controller is configured to:

store first data in a first location within the storage area upon reception of a storage request for the first data with a first file identifier for a first file being specified;

hold information for associating the first file identifier, the first location, a retention period of the data, and predetermined first application version information with one another, the predetermined first application version information indicating a predetermined first application version with which the first data is compatible;

store second data in a second location within the storage area upon reception of a storage request for the second data with the first file identifier and second application version information being specified, the second data being derived from the first data to be compatible with a second application version indicated by the second application version information;

hold information for associating the first file identifier, the second location, and the second application version information with one another;

inhibit the first data from being changed before elapse of the retention period of the data; and inhibit the second data stored in the second location associated with the first file identifier from being changed before the elapse of the retention period of the data.

2. The storage system according to claim 1, wherein the controller is further configured to:

hold information for associating each of a plurality of locations within the storage area including the first location and the second location with an identifier of each of the one or more computers coupled to the storage system;

read, upon reception of a reference request for data with the first file identifier being specified from the computer, data stored in a location associated with the identifier of the computer that has transmitted the reference request from among the plurality of locations associated with the first file identifier; and transmit the read data to the computer.

3. The storage system according to claim 1, wherein the controller is further configured to:

hold information for associating each of a plurality of locations within the storage area including the first location and the second location with an identifier of software;

read, upon reception of a reference request for data with the first file identifier and the identifier of the software being specified from the computer, data stored in a location associated with the specified identifier of the software from among the plurality of locations associated with the first file identifier, the data stored in the location associated with the specified identifier of the software being compatible with the software; and transmit the read data to the computer.

4. The storage system according to claim 1, wherein the controller is further configured to:

avoid deleting, upon reception of a deletion request for data with the first file identifier and the first application version information being specified from the computer, information for associating the first file identifier, the first location, and the first application version information with one another and the first data; and delete, upon reception of a deletion request for data with the first file identifier and the second application version information being specified from the computer, information for associating the first file identifier, the second location, and the second application version information with one another.

5. The storage system according to claim 1, wherein the controller is further configured to:

hold information for associating each of a plurality of locations within the storage area including the first location and the second location with an identifier of software; and transmit, upon reception of a list creation request with a first software identifier and a second software identifier being specified from the computer, the first file identifier to the computer in a case where a plurality of identifiers of the software associated with the plurality of locations within the storage area associated with the first file identifier include the first software identifier and exclude the second software identifier.

6. The storage system according to claim 1, wherein the controller further holds information indicating an attribute common to the first data and the second data.

7. The storage system according to claim 6, wherein the information indicating the attribute comprises information for controlling which one of permission and inhibition is to be given to user-basis access to a file identified by the first file identifier.

8. A method of managing data for a storage system coupled to one or more computers, the storage system comprising:

a storage device for providing a storage area for data; and a controller for controlling data to be written to and read from the storage area, the method comprising:

storing, by the controller, first data in a first location within the storage area upon reception of a storage request for the first data with a first file identifier being specified;

holding, by the controller, information for associating the first file identifier, the first location, a retention period of the data, and predetermined first application version information with one another, the predetermined first application version information indicating a predetermined first application version with which the first data is compatible;

storing, by the controller, second data in a second location within the storage area upon reception of a storage request for the second data with the first file identifier and second application version information being specified, the second data being derived from the first data to be compatible with a second application version indicated by the second application version information;

holding, by the controller, information for associating the first file identifier, the second location, and the second application version information with one another;

inhibiting, by the controller, the first data from being changed before elapse of the retention period of the data; and inhibiting, by the controller, the second data stored in the second location associated with the first file identifier from being changed before the elapse of the retention period of the data.

9. The method according to claim 8, wherein:

the controller holds information for associating each of a plurality of locations within the storage area including the first location and the second location with an identifier of each of the one or more computers coupled to the storage system; and the method further comprises reading, by the controller, upon reception of a reference request for data with the first file identifier being specified from the computer, data stored in a location associated with the identifier of the computer that has transmitted the reference request from among the plurality of locations associated with the first file identifier, and transmitting the read data to the computer.

10. The method according to claim 8, wherein:

the controller holds information for associating each of a plurality of locations within the storage area including the first location and the second location with an identifier of software;

the method further comprises reading, by the controller, upon reception of a reference request for data with the first file identifier and the identifier of the software being specified from the computer, data stored in a location associated with the specified identifier of the software from among the plurality of locations associated with the first file identifier, and transmitting the read data to the computer, and wherein the data stored in the location associated with the specified identifier of the software is compatible with the software.

11. The method according to claim 8, further comprising:

transmitting, by the controller, upon reception of a deletion request for data with the first file identifier and the first application version information being specified from the computer, information indicating avoidance of deleting information for associating the first file identifier, the first location, and the first application version information with one another and the first data; and deleting, by the controller, upon reception of a deletion request for data with the first file identifier and the second application version information being specified from the computer, information for associating the first file identifier, the second location, and the second application version information with one another.

12. The method according to claim 8, wherein:

the controller holds information for associating each of a plurality of locations within the storage area including the first location and the second location with an identifier of software; and the method further comprises transmitting, by the controller, upon reception of a list creation request with a first software identifier and a second software identifier being specified from the computer, the first file identifier to the computer in a case where a plurality of identifiers of the software associated with the plurality of locations within the storage area associated with the first file identifier include the first software identifier and exclude the second software identifier.

13. The method according to claim 8, wherein the controller further holds information indicating an attribute common to the first data and the second data.

14. The method according to claim 13, wherein the information indicating the attribute comprises information for controlling which one of permission and inhibition is to be given to user-basis access to a file identified by the first file identifier.

* * * * *